(12) United States Patent
Zhang et al.

(10) Patent No.: US 12,199,430 B2
(45) Date of Patent: Jan. 14, 2025

(54) CURRENT TRANSFORMER, METHOD FOR DISTRIBUTING ELECTRIC ENERGY USING SAME, AND ELECTRIC ENERGY DISTRIBUTION SYSTEM

(71) Applicant: Gree Electric Appliances, Inc. of Zhuhai, Guangdong (CN)

(72) Inventors: Xuefen Zhang, Guangdong (CN); Zhigang Zhao, Guangdong (CN); Ningning Chen, Guangdong (CN); Meng Li, Guangdong (CN); Dongrui Qu, Guangdong (CN); Chongyang Feng, Guangdong (CN); Han Liu, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 851 days.

(21) Appl. No.: 17/288,112

(22) PCT Filed: Sep. 11, 2019

(86) PCT No.: PCT/CN2019/105319
§ 371 (c)(1),
(2) Date: Apr. 23, 2021

(87) PCT Pub. No.: WO2020/082926
PCT Pub. Date: Apr. 30, 2020

(65) Prior Publication Data
US 2021/0376607 A1    Dec. 2, 2021

(30) Foreign Application Priority Data

Oct. 24, 2018 (CN) .......................... 201811246853.8

(51) Int. Cl.
*H02J 3/00* (2006.01)
*H02J 3/14* (2006.01)

(52) U.S. Cl.
CPC ............ *H02J 3/0075* (2020.01); *H02J 3/144* (2020.01)

(58) Field of Classification Search
None
See application file for complete search history.

(56) References Cited

U.S. PATENT DOCUMENTS 10,088,187 B2    10/2018  He et al.
10,749,342 B2 *   8/2020  Geng ..................... H02J 3/14
(Continued)

FOREIGN PATENT DOCUMENTS

CN    102099790 A    6/2011
CN    102305454 A    1/2012
(Continued)

*Primary Examiner* — Thomas C Lee
*Assistant Examiner* — Anzuman Sharmin
(74) *Attorney, Agent, or Firm* — The Webb Law Firm

(57) ABSTRACT

The present disclosure provides a current transformer, a method for distributing electric energy using the same, and an electric energy distribution system, and relates to the technical field of household appliances. The method includes: calculating distribution coefficients of energy required for loads according to the number of the loads and rated energy demands of the respective loads; acquiring energy demand ranges of the loads; and distributing energy to the loads according to the energy demand ranges and the distribution coefficients based on energy of a power supply end.

13 Claims, 2 Drawing Sheets

---

Calculating Distribution distribution coefficients of energy required for by the loads are calculated according to the number of the loads and rated energy demands of the respective loads — S10

Acquiring Energy energy demand ranges of the respective loads — S20

Distributing energy to the loads according to the energy demand ranges and the distribution coefficients of the energy required for the respective loads Based based on energy of the power supply end — S30

(56) References Cited

U.S. PATENT DOCUMENTS

| | | |
|---|---|---|
| 10,753,632 B2 | 8/2020 | Nakajima et al. |
| 10,916,945 B2 | 2/2021 | Kudo |
| 2006/0207269 A1* | 9/2006 | Jung ................ F24F 11/30 |
| | | 62/130 |
| 2011/0126206 A1 | 5/2011 | Kato et al. |
| 2012/0137158 A1 | 5/2012 | Nelluri et al. |
| 2014/0094983 A1 | 4/2014 | Dykeman et al. |
| 2014/0236365 A1* | 8/2014 | Martin ............. H04L 43/0847 |
| | | 700/286 |
| 2015/0134138 A1 | 5/2015 | Seo et al. |
| 2018/0046237 A1* | 2/2018 | Chadha ............ G06F 1/3234 |
| 2018/0101214 A1* | 4/2018 | Mahindru ......... G06F 9/5094 |
| 2018/0172309 A1* | 6/2018 | Niikura ............ F24F 11/46 |

FOREIGN PATENT DOCUMENTS

| | | |
|---|---|---|
| CN | 103512151 A | 1/2014 |
| CN | 104126260 A | 10/2014 |
| CN | 104699015 A | 6/2015 |
| CN | 104734180 A | 6/2015 |
| CN | 104748323 A | 7/2015 |
| CN | 104795832 A | 7/2015 |
| CN | 105222266 A | 1/2016 |
| CN | 106685313 A | 5/2017 |
| CN | 106771566 A | 5/2017 |
| CN | 106787097 A | 5/2017 |
| CN | 107940705 A | 4/2018 |
| CN | 108151233 A | 6/2018 |
| CN | 109347094 A | 2/2019 |
| GB | 2506401 A | 4/2014 |
| JP | 2014120108 A * | 6/2014 |
| WO | 2013121700 A1 | 8/2013 |
| WO | 2017145465 A1 | 8/2017 |
| WO | 2017195391 A1 | 11/2017 |

\* cited by examiner

CURRENT TRANSFORMER, METHOD FOR DISTRIBUTING ELECTRIC ENERGY USING SAME, AND ELECTRIC ENERGY DISTRIBUTION SYSTEM

CROSS-REFERENCE TO RELATED APPLICATION

The present application is a National Stage of International Application No. PCT/CN2019/105319 filed on Sep. 11, 2019, which claims the priority of the Chinese patent application No. 201811246853.8, entitled "CURRENT TRANSFORMER, METHOD FOR DISTRIBUTING ELECTRIC ENERGY USING SAME, AND ELECTRIC ENERGY DISTRIBUTION SYSTEM" and filed on Oct. 24, 2018, both of which are incorporated herein by reference in their entireties.

BACKGROUND OF THE INVENTION

Field of the Invention

The present disclosure relates to the technical field of household appliances, in particular to a current transformer, a method for distributing electric energy using the same, and an electric energy distribution system.

Description of Related Art

In the case where a power supply system drives a plurality of loads, or energy is supplied to a plurality of loads by a centralized intelligent current transformer, there is a problem of energy distribution to the plurality of loads. For example, a photovoltaic DC (Direct Current) drive variable-frequency air conditioning system uses a direct current output from a photovoltaic power generation system to provide energy to a variable-frequency air conditioner. In a DC power supply system, when energy is supplied to a multi-split DC air conditioning system or a multiple DC air conditioning system by a centralized intelligent current transformer, there is a problem of energy distribution to a plurality of air conditioners.

SUMMARY OF THE INVENTION

According to one aspect of the present disclosure, a method for distributing electric energy using a current transformer is proposed. The method is used to distribute energy for a plurality of loads according to energy of a power supply end. The method includes: calculating distribution coefficients of energy for the loads according to the number of the loads and rated energy demands of the respective loads; acquiring adjustable energy ranges of the loads; and distributing energy to the loads according to the adjustable energy ranges and the distribution coefficients.

In some embodiments, between calculating distribution coefficients of energy for the loads according to the number of the loads and rated energy demands of the respective loads, and acquiring adjustable energy ranges of the loads, the method includes: acquiring initial distributable energy of the current transformer; and pre-distributing energy to the loads according to the initial distributable energy and the energy distribution coefficients; and adjusting energy supply to the loads according to the adjustable energy ranges and the distribution coefficients includes: obtaining final distributable energy according to the initial distributable energy and the adjustable energy ranges of the loads; and redistributing energy for the loads according to the final distributable energy and the distribution coefficients.

In some embodiments, distributing energy to the loads according to the adjustable energy ranges and the distribution coefficients includes: adjusting the energy supply to the loads according to the adjustable energy ranges and the distribution coefficients; calculating the remaining energy after adjustment; and distributing the remaining energy after adjustment to the loads according to the distribution coefficients.

In some embodiments, the loads include air conditioners; and acquiring adjustable energy ranges of the loads includes: acquiring operating data of each air conditioner; and determining an adjustable energy range of each air conditioner load based on the operating data and preset operating parameters.

In some embodiments, the operating data includes an operating mode of the air conditioner; and the preset operating parameters include indoor temperature ranges in various modes.

According to a second aspect, an embodiment of the present disclosure provides a device for distributing electric energy using a current transformer. The device is used to distribute energy for a plurality of loads according to energy of a power supply end. The device includes: a calculation module configured to obtain distribution coefficients of energy for the loads according to the number of the loads and rated energy demands of the respective loads; an acquisition module configured to acquire adjustable energy ranges of the loads; and a distribution module configured to distribute energy to the loads according to the adjustable energy ranges and the distribution coefficients.

According to a third aspect, an embodiment of the present disclosure provides a current transformer, including: at least one processor; and a memory communicably connected with the at least one processor, wherein the memory stores instructions executable by one processor, and the instructions are executed by the at least one processor to cause the at least one processor to execute the method for distributing electric energy using the current transformer of any implementation of the first aspect described above.

According to a fourth aspect, an embodiment of the present disclosure provides an electric energy distribution system, including: a current transformer of the second aspect described above, with one end configured to be electrically connected to a power supply end; a plurality of air conditioner respectively electrically connected to the other end of the current transformer; and a communication device communicably connecting the current transformer and the air conditioners.

In some embodiments, the power supply end includes: at least one of a photovoltaic power generation system, an energy storage battery system, a wind power generation system, or a public power grid system.

In some embodiments, the communication device includes: a wired communication device or a wireless communication device; and communication modes of the communication device include: a real-time data sharing or master-slave communication mode.

According to a fifth aspect of the present disclosure, an embodiment of the present disclosure further provides a computer readable storage medium storing computer program instructions, wherein the instructions, when executed by a processor, implement the above-mentioned method for distributing electric energy using a current transformer.

Other features and advantages of the present disclosure will become apparent from the following detailed description of exemplary embodiments of the present disclosure with reference to the accompanying drawings.

BRIEF DESCRIPTION OF THE DRAWINGS

The drawings constituting a part of the specification describe embodiments of the present disclosure, and together with the specification, serve to explain the principle of the present disclosure.

With reference to the accompanying drawings, the present disclosure can be understood more clearly according to the following detailed description, in which.

DETAILED DESCRIPTION OF THE INVENTION

Figure 1:
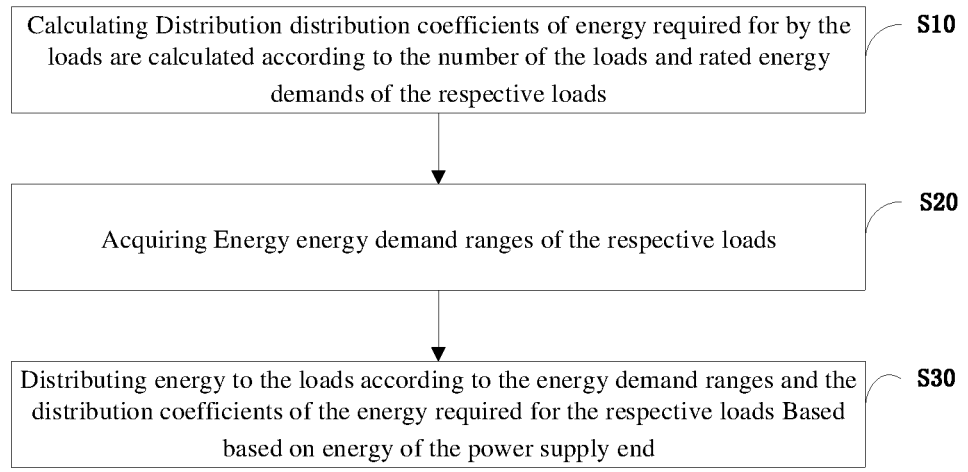
FIG. 1 shows a schematic flow diagram of some embodiments of a method for distributing electric energy using a current transformer of the present disclosure.

Various exemplary embodiments of the present disclosure will now be described in detail with reference to the accompanying drawings. It is to be noted that unless specifically stated otherwise, the relative arrangement of components and steps, numerical expressions and numerical values set forth in these embodiments do not limit the scope of the present disclosure.

Furthermore, it should be understood that, for ease of description, the sizes of various parts shown in the drawings are not drawn in accordance with actual proportional relationships.

The following description of at least one exemplary embodiment is actually only illustrative, and in no way serves as any limitation to the present disclosure and its application or use.

Technologies, methods, and devices known to those of ordinary skill in the related art may be not discussed in detail, but where appropriate, the technologies, methods, and device should be regarded as part of the specification as granted.

In all examples shown and discussed here, any specific value should be interpreted as merely exemplary, rather than as a limitation. Therefore, other examples of an exemplary embodiment may have various values.

It should be noted that similar reference numerals and letters denote similar items in the following drawings, so once a certain item is defined in one drawing, it does not need to be further discussed in subsequent drawings.

To make the objectives, technical solutions and advantages of the present disclosure clearer, the present invention will be further described in detail below in conjunction with the accompanying drawings and embodiments.

With the rapid development of electric DC transformation, household appliances have developed into a DC transformation process. For example, a photovoltaic DC drive variable-frequency air conditioning system uses a direct current output from a photovoltaic power generation system to provide energy to a variable-frequency air conditioner. At present, such a photovoltaic DC drive variable-frequency air conditioning system only includes one air conditioner, and a grid-connected intelligent current transformation module is still integrated within a unit, so the air conditioning system is not fully upgraded in DC transformation. To achieve the full upgrade of DC transformation of the air conditioning system, a multi-split DC air conditioning system or a multiple DC air conditioning system needs to be supplied energy by a centralized intelligent current transformer. However, the energy required for an air conditioner may change during operation, and the intelligent current transformer cannot effectively distribute energy to each air conditioner, resulting in that energy cannot be scheduled effectively and used efficiently.

In some embodiments of the present disclosure, a method for distributing electric energy using a current transformer is provided. The method is used for distributing energy of a power supply end to a plurality of loads, such as distributing energy to loads in a DC drive variable-frequency air conditioning system according to the energy of the power supply end. The method may also be applied to a multi-split AC air conditioning system. For convenience of description, in some embodiments, a DC drive variable-frequency air conditioning system is used as an example for introduction. Specifically referring to FIG. 1, the method includes:

S10. Calculating distribution coefficients of energy required by the loads according to the number of the loads and rated energy demands of the respective loads;

In some embodiments, DC air conditioners are used as an example of the loads for description. An installed capacity of the current transformer is designed according to an energy demand of a plurality of DC air conditioners. For example, if the energy demand of the plurality of DC air conditioners is 5 kW, the capacity of the current transformer is designed to be 5 kW. The power supply end of the current transformer, such as a photovoltaic power generation system, is also designed to be 5 kW. The number of the loads is already determined at the beginning of the system design, and the energy demand of each air conditioner can be obtained according to a rated power of the air conditioner. The distribution coefficient of the energy demand of each air conditioner can be the proportion of the energy required for the air conditioner in total energy supply. For example, the total energy supply of the current transformer is 1, the number of the air conditioners is 5, and the energy demands of the air conditioners are 1 kW, 1.5 kW, 3 kW, 2 kW, and 2.5 kW, respectively. Accordingly, the distribution coefficients of the energy required for the air conditioners are 0.1, 0.15, 0.3, 0.2, and 0.25, respectively. After the distribution coefficient of the energy required for each air conditioner is obtained, approximate energy required for each air conditioner can be calculated. Initial distributable energy of the power supply end can be pre-distributed to the loads according to the distribution coefficient of the energy required for each air conditioner to ensure a basic operation demand of the loads. The initial distributable energy of the power supply end can be determined by the rated powers of all air conditioners. That is, it can be determined according to a total power of the system. In designing, the power of the power supply end is designed according to the total power of the system.

S20. Acquiring energy demand ranges of the respective loads.

In some embodiments, the energy demand ranges of the loads can be determined according to a user's usage habits, and a load operation mode or an external environment. Using an air conditioner as an example, the energy required for the air conditioner is different in cooling, heating, dehumidification, ventilation and other working modes, and the energy required for the air conditioner is also different under various power conditions in the same working mode. For example, in cooling/heating, the energy required for the air conditioner is also different for various set temperatures of the air conditioner or various indoor temperatures. For example, in cooling/heating, the indoor temperature at which the user feeds comfortable changes within a certain range. Accordingly, the energy demand of each air conditioner also needs to change within a certain range. The energy demand range of each air conditioner can be calculated according to the actual operation condition of the air conditioner.

S30. Distributing energy to the loads according to the energy demand ranges and the distribution coefficients of the energy required for the respective loads based on energy of the power supply end. After the energy demand floating ranges of the loads are determined, energy is distributed to the loads according to the floating ranges and the distribution coefficients.

The distribution coefficients of the energy required for the loads, that is, the proportions of the energy required for the respective loads in the total energy supply, are determined according to the number of the loads and the energy demands of the respective loads, and energy is distributed reasonably to the respective loads according to the distribution coefficients of the required energy and the energy demand ranges of the loads, so that the utilization rate of energy can be improved, and effective scheduling of the power consumption system with a plurality of loads is guaranteed, thereby ensuring that the energy demand of the loads is controllable, and achieving refined management and efficient use of system energy.

In this embodiment, the total energy actually required to be provided by the power supply end can also be determined according to the energy demand ranges of the loads, that is, floating ranges of the energy required for the respective loads, so that excess energy can be stored under the premise of ensuring the energy demands of the respective loads, or electric energy is scheduled from other power supply systems in the case of insufficient energy supply of the power supply end, thereby further improving the refined management and efficient use of the system energy.

In some embodiments, energy is distributed to the loads in two ways. For example, after the distribution coefficients of the energy required for the respective loads are determined, the initial distributable energy of the power supply end is acquired; energy is pre-distributed to the loads according to the distribution coefficients and the initial distributable energy; and the energy demand ranges of the loads are calculated after the initial distributable energy provided by the power supply end is pre-distributed according to the distribution coefficients. Using air conditioners as an example, energy demand ranges of the respective air conditioners can be determined based on the user's basic comfort. In cooling/heating as an example, basic comfort data of the human body in a cooling condition is 23.2° C.-27.8° C., and basic comfort data of the human body in a heating condition is 16.8° C.-24.6° C. The basic comfort data of the human body can be adjusted according to actual applications. Cooling/heating energy demand data of the respective air conditioners can be calculated with reference to the following formula:

$$\Delta Q_n = C * \frac{d(\Delta T_{rn})}{dt}$$

where $\Delta Q_n$ represents an adjustable cooling/heating power of an nth air conditioner, the value range of $\Delta Q_n$ can represent the energy demand range of the load, C represents a building heat capacity, and $\Delta T_{rn}$ represents an adjustable temperature difference of the nth air conditioner according to the basic comfort of the human body.

According to a conversion relationship between a cooling/heating energy demand and an electric power, an adjustable electric power of each air conditioner can be expressed by the following formula:

$$\Delta P_{en} = \frac{\Delta Q_n}{\lambda_{cop}}$$

wherein $\Delta P_{en}$ represents an adjustable electric power of the nth air conditioner, and $\lambda_{cop}$ represents an energy efficiency ratio of the air conditioner.

Final distributable energy of the power supply end is calculated according to the initial distributable energy of the power supply end and the energy demand ranges of the respective loads; and based on the final distributable energy, the energy for the loads is redistributed according to the distribution coefficients. According to the adjustable electric power data of the air conditioners, the total amount of the final distributable energy of the power supply end is calculated as expressed by the following formula:

$$P_{ef}=P_e+\Delta P_{e1}+ \ldots +\Delta P_{en}$$

where $P_{ef}$ represents the final distributable energy of the power supply end, and $P_e$ represents the initial distributable energy of the power supply end. In some embodiments, the initial distributable energy of the power supply end is obtained by calculation according to the energy demands of the loads and after the power supply capability of the system is calibrated.

In some embodiments, the energy supply of the power supply system can be adjusted according to the final distributable energy, so that excess energy is stored under the premise of ensuring the energy demands of the loads, or electric energy is scheduled from other power supply systems in the case of insufficient energy supply, thereby further improving the refined management and efficient use of the system energy.

In some embodiments, another energy distribution method can be used in the case of sufficient energy supply of the power supply system. For example, after the distribution coefficients of the energy required for the respective loads are determined, the initial distributable energy of the power supply end is acquired; based on the initial distributable energy, energy is pre-distributed to the loads according to the distribution coefficients of the energy required for the respective loads; and the energy demand ranges of the loads are calculated after the initial distributable energy provided by the power supply end is pre-distributed according to the distribution coefficients. Using air conditioners as an example, energy demand ranges of the respective air conditioners can be determined based on the user's basic comfort. For the specific calculation method, reference can be made to the description of the calculation of the load energy demand range in the foregoing embodiment.

After the energy demand ranges of the respective loads are calculated, the energy of the power supply end is adjusted according to the energy demand ranges and the distribution coefficients of the respective loads; and the remaining energy of the power supply end after adjustment is distributed to the loads according to the distribution coefficients. The remaining energy of the power supply end is the difference between the sum of the energy required for actual operation of the loads and the initial distributable energy of the power supply end.

In some embodiments, the energy of the power supply end adjusted based on the initial distributable energy is calculated according to the sum of the energy demand ranges of the respective loads, and the adjusted energy is distributed to the loads according to the distribution coefficients.

Figure 2:
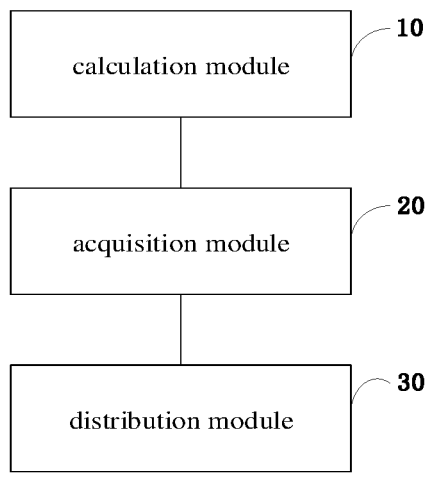
FIG. 2 shows a schematic structural diagram of some embodiments of a current transformer of the present disclosure.

According to some embodiments, as shown in FIG. 2, a current transformer is provided. The current transformer is used for distributing energy to a plurality of loads. The current transformer includes: a calculation module 10 configured to calculate distribution coefficients of energy required for the loads according to the number of the loads and rated energy demands of the respective loads; an acquisition module 20 configured to acquire energy demand ranges of the respective loads; and a distribution module 30 configured to distribute energy to the loads according to the energy demand ranges and the distribution coefficients based on energy of a power supply end.

Figure 3:
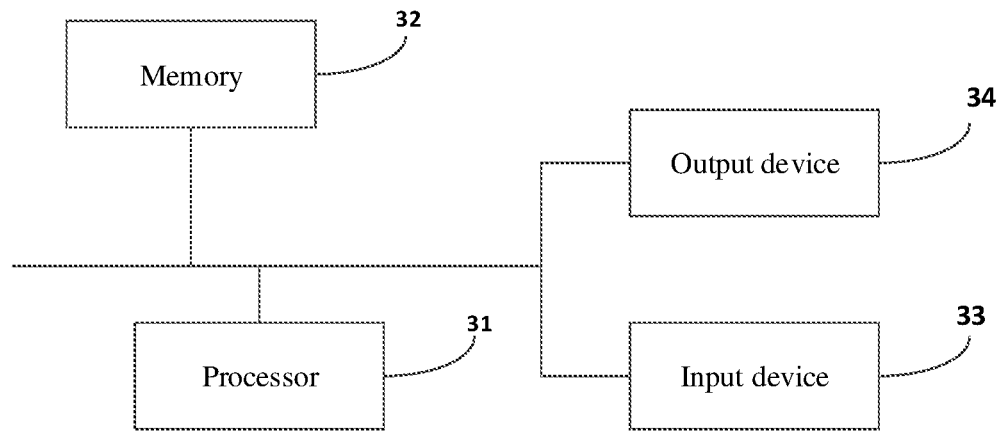
FIG. 3 shows a schematic structural diagram of some other embodiments of the current transformer of the present disclosure.

An embodiment of the present disclosure provides a current transformer, as shown in FIG. 3. The current transformer includes one or more processors 31 and a memory 32. One processor 33 is used as an example in FIG. 3.

The current transformer may further include: an input device 33 and an output device 34.

The processor 31, the memory 32, the input device 33 and the output device 34 may be connected via a bus or by other means. Connection via a bus is used as an example in FIG. 3.

The processor 31 may be a central processing unit (CPU). The processor 31 may also be other general-purpose processor, a digital signal processor (DSP), an application specific integrated circuit (ASIC), a field-programmable gate array (FPGA), or other programmable logic device, a discrete gate or transistor logic device, a discrete hardware component or other chip, or a combination of the above-mentioned various types of chips. The general-purpose processor may be a microprocessor, or the processor may also be any conventional processor or the like.

The memory 32, as a non-transitory computer readable storage medium, may be used to store non-transitory software programs, non-transitory computer executable programs and modules, such as program instructions/modules corresponding to the method for distributing electric energy using the current transformer in the embodiments of the present disclosure. The processor 31 runs the non-transitory software programs, instructions and modules stored in the memory 32 to execute various function applications of a server and data processing, i.e. implementing the method for distributing electric energy using the current transformer in the method embodiments mentioned above.

The memory 32 may include a program storing area and a data storing area, wherein the program storing area may store an operating system, and an application program required for at least one function; and the data storing area may store data created in the use of a processing device according to operations of a user terminal, and the like. In addition, the memory 32 may include a high-speed random access memory, and may also include a non-transitory memory, such as at least one magnetic disk storage device, flash memory device, or other non-transitory solid-state storage device. In some embodiments, the memory 32 optionally includes memories arranged remotely relative to the processor 31, and these remote memories may be connected to an image detecting and processing device via network connection. Examples of the network described above include, but are not limited to, the Internet, an intranet, a local area network, a mobile communication network and combinations thereof.

The input device 33 may receive input numerical or character information and produce a key signal input related to user settings and functional control of the processing device of the user terminal. The output device 34 may include a display device such as a display screen.

One or more modules are stored in the memory 32, and when executed by the one or more processors 31, execute the method as shown in FIG. 1.

An embodiment of the present disclosure further provides a non-transitory computer readable storage medium, storing computer instructions configured to cause a computer to execute the method for distributing electric energy using the current transformer of any one of the foregoing embodiments. The storage medium may be a magnetic disk, an optical disk, a read-only memory (ROM), a random access memory (RAM), a flash memory, a hard disk drive (HDD), a solid-state drive (SSD), or the like; and the storage medium may also include a combination of the aforementioned types of storage.

Figure 4:
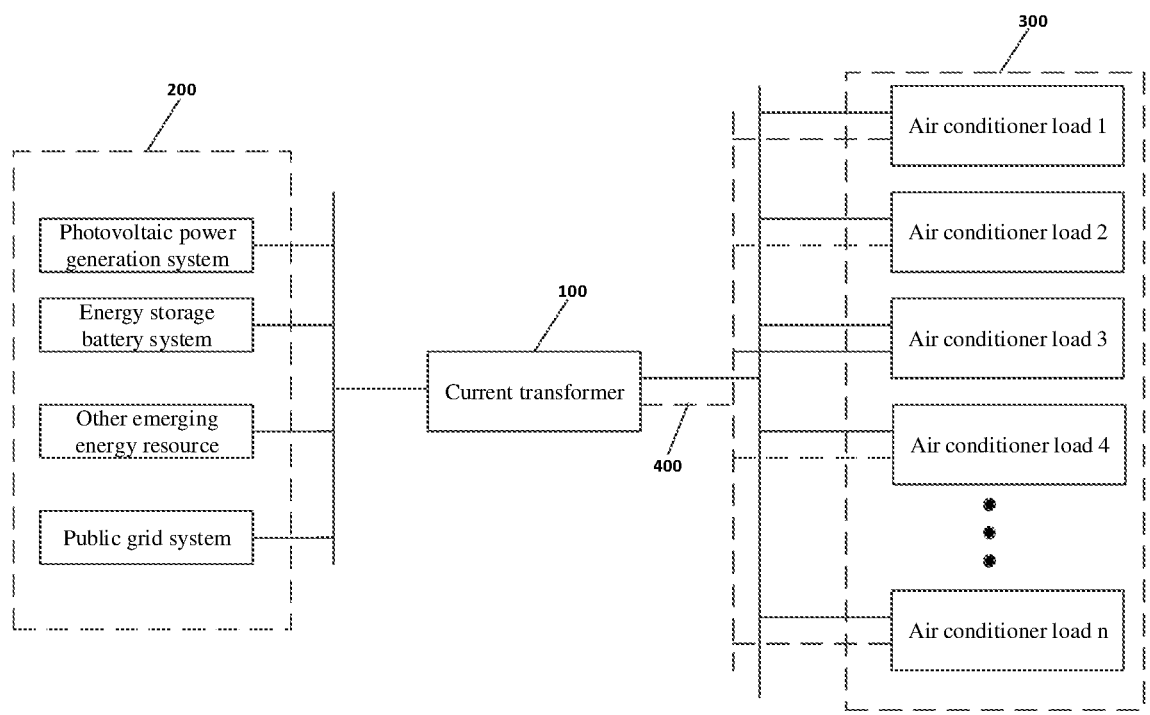
FIG. 4 shows a schematic structural diagram of some embodiments of an electric energy distribution system of the present disclosure.

An embodiment of the present disclosure also provides an electric energy distribution system, as shown in FIG. 4, which includes a current transformer 100 in the foregoing embodiments, a plurality of air conditioners 300, and a communication device 400. The current transformer 100 is connected to a power supply end 200 at one end, and connected to a plurality of air conditioners 300 respectively at the other end; and the communication device 400 is configured to implement communication between the current transformer 100 and the air conditioners 300.

As an optional embodiment, the power supply end 200 may include: at least one of a photovoltaic power generation system, an energy storage battery system, a wind power generation system, and a public power grid system. The communication device 400 may include: a wired communication device or a wireless communication device; and communication modes of the communication device include: a real-time data sharing or master-slave communication mode.

At this point, the present disclosure has been described in detail. To avoid obscuring the concept of the present disclosure, some details known in the art are not described. Based on the above description, those skilled in the art can fully understand how to implement the technical solutions disclosed herein.

Although some specific embodiments of the present disclosure have been described in detail by using examples, those skilled in the art should understand that the above examples are only for illustration and not for limiting the scope of the present disclosure. Those skilled in the art should understand that the above embodiments can be modified without departing from the scope and spirit of the present disclosure. The scope of the present disclosure is defined by the appended claims.

What is claimed is:

1. A method for distributing electric energy using a current transformer, comprising:
   calculating a plurality of distribution coefficients of energy required by a plurality of loads according to the number of the plurality of loads and a plurality of rated energy demands of the respective plurality of loads;
   acquiring a plurality of energy demand ranges of the plurality of loads; and distributing energy to the plurality of loads according to the plurality of energy demand ranges and the plurality of distribution coefficients based on energy of a power supply end, wherein based on energy of a power supply end, distributing energy to the plurality of loads according to the plurality of energy demand ranges and the plurality of distribution coefficients comprises:

acquiring initial distributable energy of the power supply end;

pre-distributing energy to the plurality of loads according to the plurality of distribution coefficients and the initial distributable energy;

obtaining final distributable energy of the power supply end according to the initial distributable energy and the plurality of energy demand ranges of the respective plurality of loads; and based on the final distributable energy of the power supply end, adjusting the pre-distributed energy to the plurality of loads according to the distribution coefficients, or wherein based on energy of a power supply end, distributing energy to the plurality of loads according to the plurality of energy demand ranges and the plurality of distribution coefficients comprises:

acquiring initial distributable energy of the power supply end;

pre-distributing energy to the plurality of loads according to the plurality of distribution coefficients and the initial distributable energy;

adjusting the energy of the power supply end according to the plurality of energy demand ranges and the plurality of distribution coefficients;

calculating the remaining energy of the power supply end after adjustment; and distributing the remaining energy of the power supply end after adjustment to the plurality of loads according to the plurality of distribution coefficients, wherein the loads comprise air conditioners, and acquiring energy demand ranges of the loads comprises:

acquiring operating data of each of the air conditioners; and based on the operating data and preset operating parameters, determining the energy demand range of each of the air conditioners, wherein the operating data comprises an operating mode of the air conditioner; and the preset operating parameters comprise indoor temperature ranges in different operating modes.

2. A non-volatile non-transitory computer readable storage medium storing computer program instructions, wherein the instructions, when executed by a processor, implement the method for distributing electric energy using the current transformer of claim 1.

3. The method for distributing electric energy using the current transformer of claim 1, wherein the plurality of loads comprise a plurality of air conditioners; and acquiring the plurality of energy demand ranges of the plurality of loads comprises:

acquiring operating data for each of the plurality of air conditioners; and based on the operating data and a plurality of preset operating parameters, determining an energy demand range of each of the plurality of air conditioners.

4. The method for distributing electric energy using the current transformer of claim 1, wherein the plurality of loads comprise a plurality of air conditioners; and acquiring the plurality of energy demand ranges of the plurality of loads comprises:

acquiring operating data for each of the plurality of air conditioners; and based on the operating data and a plurality of preset operating parameters, determining an energy demand range of each of the plurality of air conditioners.

5. A current transformer, comprising:

a calculation module, configured to obtain a plurality of distribution coefficients of energy required for a plurality of loads according to the number of the plurality of loads and a plurality of rated energy demands of the respective plurality of loads;

an acquisition module configured to acquire a plurality of energy demand ranges of the respective plurality of loads; and a distribution module configured to distribute energy to the plurality of loads according to the plurality of energy demand ranges and the plurality of distribution coefficients based on energy of a power supply end, wherein based on energy of a power supply end, distributing energy to the plurality of loads according to the plurality of energy demand ranges and the plurality of distribution coefficients comprises:

acquiring initial distributable energy of the power supply end;

pre-distributing energy to the plurality of loads according to the plurality of distribution coefficients and the initial distributable energy;

obtaining final distributable energy of the power supply end according to the initial distributable energy and the plurality of energy demand ranges of the respective plurality of loads; and based on the final distributable energy of the power supply end, adjusting the pre-distributed energy to the plurality of loads according to the distribution coefficients, or wherein based on energy of a power supply end, distributing energy to the plurality of loads according to the plurality of energy demand ranges and the plurality of distribution coefficients comprises:

acquiring initial distributable energy of the power supply end;

pre-distributing energy to the plurality of loads according to the plurality of distribution coefficients and the initial distributable energy;

adjusting the energy of the power supply end according to the plurality of energy demand ranges and the plurality of distribution coefficients;

calculating the remaining energy of the power supply end after adjustment; and distributing the remaining energy of the power supply end after adjustment to the plurality of loads according to the plurality of distribution coefficients, wherein the loads comprise air conditioners, and acquiring energy demand ranges of the loads comprises:

acquiring operating data of each of the air conditioners; and based on the operating data and preset operating parameters, determining the energy demand range of each of the air conditioners, wherein the operating data comprises an operating mode of the air conditioner; and the preset operating parameters comprise indoor temperature ranges in different operating modes.

6. An electric energy distribution system, comprising:

a plurality of air conditioners;

the current transformer of claim 5, wherein a first end is configured to be electrically connected to a power supply end, and a second end is electrically connected to the plurality of air conditioners; and a communication device configured to implement communication between the current transformer and the plurality of air conditioners.

7. A current transformer, comprising:

at least one processor; and a memory, communicatively connected with the at least one processor, wherein the at least one processor is configured to execute a method for distributing electric energy using a current transformer based on instructions stored in the memory;

wherein the method for distributing electric energy using the current transformer comprises:

calculating a plurality of distribution coefficients of energy required for a plurality of loads according to the number of the plurality of loads and a plurality of rated energy demands of the respective plurality of loads;

acquiring a plurality of energy demand ranges of the plurality of loads; and based on energy of a power supply end, distributing energy to the plurality of loads according to the plurality of energy demand ranges and the plurality of distribution coefficients, wherein based on energy of a power supply end, distributing energy to the plurality of loads according to the plurality of energy demand ranges and the plurality of distribution coefficients comprises:

acquiring initial distributable energy of the power supply end;

pre-distributing energy to the plurality of loads according to the plurality of distribution coefficients and the initial distributable energy;

obtaining final distributable energy of the power supply end according to the initial distributable energy and the plurality of energy demand ranges of the respective plurality of loads; and based on the final distributable energy of the power supply end, adjusting the pre-distributed energy to the plurality of loads according to the distribution coefficients, or wherein based on energy of a power supply end, distributing energy to the plurality of loads according to the plurality of energy demand ranges and the plurality of distribution coefficients comprises:

acquiring initial distributable energy of the power supply end;

pre-distributing energy to the plurality of loads according to the plurality of distribution coefficients and the initial distributable energy;

adjusting the energy of the power supply end according to the plurality of energy demand ranges and the plurality of distribution coefficients;

calculating the remaining energy of the power supply end after adjustment; and distributing the remaining energy of the power supply end after adjustment to the plurality of loads according to the plurality of distribution coefficients, wherein the loads comprise air conditioners, and acquiring energy demand ranges of the loads comprises:

acquiring operating data of each of the air conditioners; and based on the operating data and preset operating parameters, determining the energy demand range of each of the air conditioners, wherein the operating data comprises an operating mode of the air conditioner; and the preset operating parameters comprise indoor temperature ranges in different operating modes.

8. An electric energy distribution system, comprising:

a plurality of air conditioners;

the current transformer of claim 7, with one end configured to be electrically connected to a power supply end, and the other end electrically connected to the plurality of air conditioners; and a communication device, configured to implement communication between the current transformer and the plurality of air conditioners.

9. The electric energy distribution system according to claim 8, wherein the power supply end comprises:

at least one of a photovoltaic power generation system, an energy storage battery system, a wind power generation system, or a public power grid system.

10. The electric energy distribution system according to claim 8, wherein the communication device comprises:

a wired communication device or a wireless communication device.

11. The electric energy distribution system according to claim 8, wherein a communication mode of the communication device comprises:

a real-time data sharing mode or a master-slave communication mode.

12. The current transformer according to claim 7, wherein the plurality of loads comprise a plurality of air conditioners; and acquiring the plurality of energy demand ranges of the plurality of loads comprises:

acquiring operating data for each of the plurality of air conditioners; and based on the operating data and a plurality of preset operating parameters, determining an energy demand range for each of the plurality of air conditioners.

13. The current transformer according to claim 12, wherein the operating data comprises an operating mode for each of the plurality of air conditioners; and the plurality of preset operating parameters comprise a plurality of indoor temperature ranges for different operating modes.

* * * * *

UNITED STATES PATENT AND TRADEMARK OFFICE
CERTIFICATE OF CORRECTION

PATENT NO. : 12,199,430 B2
APPLICATION NO. : 17/288112
DATED : January 14, 2025
INVENTOR(S) : Xuefen Zhang et al.

Page 1 of 1

It is certified that error appears in the above-identified patent and that said Letters Patent is hereby corrected as shown below:

In the Claims

Column 9, Line 50, Claim 2, after "A" delete "non-volatile"

Signed and Sealed this
Fourth Day of March, 2025

Coke Morgan Stewart
*Acting Director of the United States Patent and Trademark Office*